United States Patent Office 3,386,152
Patented June 4, 1968

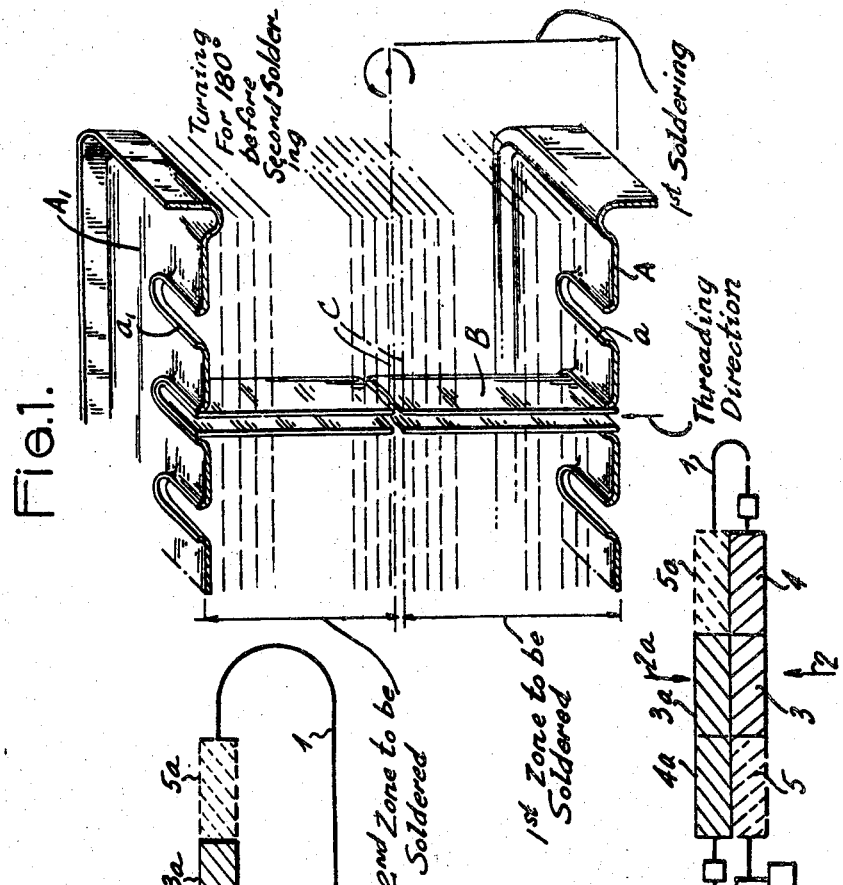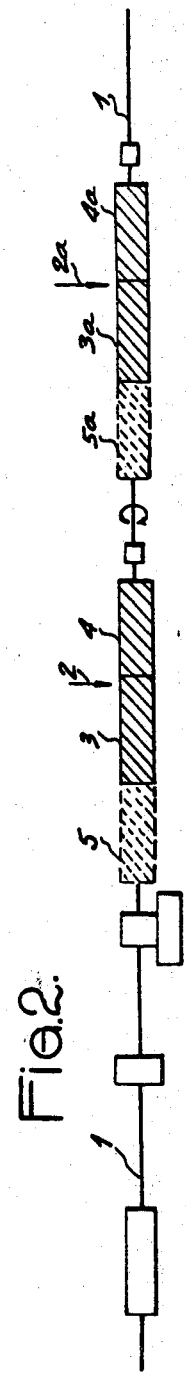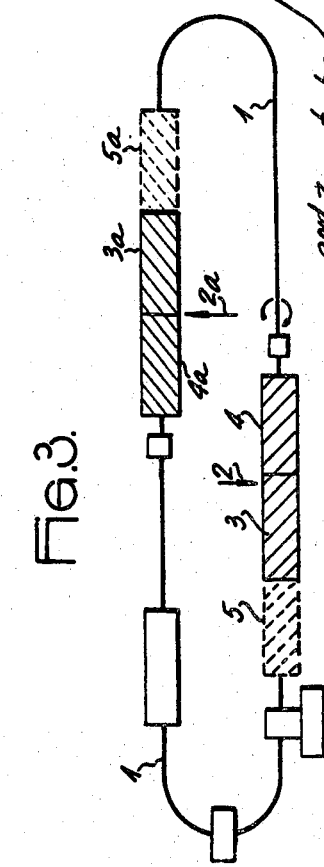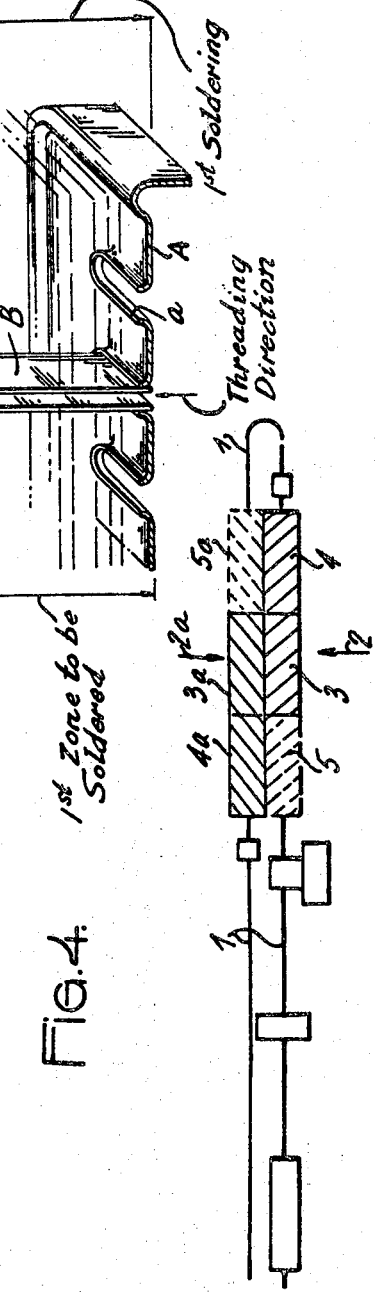

3,386,152
METHOD OF MAKING HEAT EXCHANGER NEST AND MORE PARTICULARLY COOLING RADIATORS
Alain Edouard Plegat, Asnieres, Seine, France, assignor to Societe Anonyme des Usines Chausson, Asnieres, Seine, France, a company of France
Continuation of application Ser. No. 291,719, July 1, 1963. This application Aug. 17, 1967, Ser. No. 661,469
Claims priority, application France, July 9, 1962, 903,403
4 Claims. (Cl. 29—157.3)

ABSTRACT OF THE DISCLOSURE

Heat exchanger cores, including circulating tubes covered with solder and secured at both ends to collectors also covered with solder and having collars around the holes through which the tubes extend and having heat-dissipating fins along the length of the tubes, are manufactured by assembling the collectors and the fins on the tubes to form a unit with the collars of the collectors extending in the same direction; the so-constructed unit is then submitted to fluxing; the soldering is then accomplished by blowing heated air over half of the unit and then cooling; finally, the unit is turned over and the other portion is soldered by the use of heated air and then cooled.

This application is a continuation of my application Ser. No. 291,719, filed July 1, 1963, and now abandoned.

Up till now, heat exchangers, more particularly cooling radiators, are made in several successive soldering operations. These operations firstly consist of connecting a nest of tubes by soldering to a group of fins, then to mount on this nest a lower collector and an upper collector each having collars closely surrounding the tubes. These collectors are then soldered, more particularly by dipping and the assembly is cooled.

This method of manufacture consequently necessitates, between each operation, handling and transfers between successive machines, which leads to relatively long work times, and hence, high cost prices for the articles made.

The present invention obviates this disadvantage by creating a new method of manufacturing heat exchangers, enabling the simultaneous soldering of the tubes to the fins and collectors of radiator nests or other exchangers.

According to the invention, a lower and upper collector, receive on at least one of their faces, a coat of fusible material, the lower collector is slipped on to the previously tinned tubes, placed parallel, fins and upper collector which have, for closely surrounding these tubes, collars directed in the threading direction, the feet of the tubes are bulged into the collars of the collectors, the nest thus formed is pickled by means of a flux, the traces of flux are partially eliminated, the bottom half of the nest placed vertically is heated so that the heat exchange occurs more intensely with the lower collector than with the fins whose thermic inertias are different, to create an even rise of temperature up to the threshold for which the fusible material melts and connected between them, tubes, fins and lower collector, the assembly being then cooled, then the nest is turned round for 180° on itself to bring the upper collector to the position previously occupied by the lower collector, the tubes being again vertical, lastly, the non-soldered half of the nest is heated brought to the lower part, in a similar manner to that having caused the liaison of the half already soldered, heating which is then followed by a cooling.

Various other characteristics of the invention will moreover be revealed by the detailed description which follows.

Forms of embodiment of the device for putting the method according to the invention into operation are shown, by way of non-restrictive examples, in the attached drawing.

FIGURE 1 is a partial perspective, partly in section, showing one of the characteristic phases of the method according to the invention.

FIGURE 2 is a plane view showing diagrammatically an arrangement of the device for operating the method of the invention.

FIGURES 3 and 4 are diagrammatic elevations showing other arrangements of the device.

In the method of the invention, the nest of the exchanger is formed by assembling various constitutive elements, i.e. by the assembly of tubes, fins or other secondary exchanger elements and collectors, then the assembly is subjected to a chemical pickling. A following phase consists of a progressive heating of one of the halves of the nest up to a temperature causing the melting of a soldering alloy ensuring the soldering of the parts. This operation is followed by a cooling that is controlled and limited, and a turning round, to produce, in a similar manner to the first half of the nest, the heating and soldering of the second half of this nest, then the cooling of the whole.

In a known manner, a heat exchanger comprises a considerable number of fins threaded on to the tubes or spaces arranged between the tubes whose ends are engaged in an upper and lower collector inside of which the ends of the tubes are spread out or bulged and on which water boxes are fitted.

According to the invention, the two collectors are provided with a coat of fusible material on at least one of their faces, for example, by dipping in a bath or by depositing a thin coat under atomized form by a fluid jet under pressure. Provision can also be made to form this coat of fusible material by a perforated plate, of slight thickness, inserted between each collector and the contiguous fins at the moment of assembling. The lower collector, the fins and the upper collector are then slipped on to the tubes placed parallel. These two collectors have collars directed in the threading direction, for closely surrounding the tubes, i.e., one of the collectors having collars projecting from the side of the nest whereas the other has collars projecting from the side of the water box.

To ensure a correct maintaining of all the elements during successive handlings and operations and chiefly so that the circulation of circulation liquids can subsequently be correctly carried out, the feed of the tubes that project inside the collectors are bulged as known per se. This well known operation which may be conducted for instance as related and shown in French Patent 1,038,-962 also has the effect of obtaining a better contact between the walls both of tubes and collars, thus enabling thin and stronger solderings to be effected.

The manufactured nest, whose fins or other indirect exchange surfaces and the tubes, are of tinned metal, is pickled by immersion in a suitable flux bath.

After immersion, the traces of flux are partially eliminated, so as only to retain the necessary and sufficient quantity, by providing a draining of the nest which is preferably conveyed to a sloping position to allow a good flow by gravity and avoid any retention by the fins or by the tubes which are placed in planes perpendicular in relation to each other.

After returning the nest to the vertical position, blowing takes place which completes the generally insufficient drainage.

The nest, still in the vertical position, is then put into a heating oven preparing the soldering of the lower half. This lower half is heated so that the heat exchange occurs more intensely with the collector than with the fins whose thermic inertias are lower.

To this end, two preheating zones or chambers may be provided with different heights in which the nest is successively carried along so that the first zone chiefly produces a rise in temperature of the collector and that the second zone, while continuing this rise in temperature, also ensures the heating of the fins and tubes.

A single pre-heating zone may also be provided comprising internally, either two jets of hot air at different temperature, or a single jet comprising, according to a definite plan, burners directed towards the collector.

Another heating zone is also provided for ensuring the regular rise in temperature of the whole up to the threshold for which the fusible material melts and connects the tubes, fins and lower collector together.

As shown in FIGURE 1, this first soldering is advantageously performed firstly on the lower half of the nest provided with the collector A with collars $a$ on the nest side, so that the melted solder tends to flow from the tubes B towards the collars $a$. It has been noticed that it was advantageous that the height of the ovens should be slightly greater than half the height of the nest, so as to obtain the covering of the middle part and a certitude of the soldering of the fins C (shown in phantom) extending into that part. In certain cases, a blowing point may be arranged at the exit from the soldering zone, to eliminate eventual run-outs in the tubes B.

The assembly is then subjected to a controlled cooling, by a natural lowering of the temperature or by forced lowering, more particularly by intake of the ambient air through the nests and discharge of this air towards the outside, to avoid during the soldering of the second half of the nest a rise in temperature obtained by conduction to the half already soldered, thereby causing a passing to the pasty or liquid state of the fusible material, which might be likely to interfere with the quality of the solderings previously made.

The nest is then turned round for 180° on itself to bring the upper collector A', i.e., the collector having collars $a'$ projecting on the water box side, in the place previously occupied by the lower collector A, the tubes B being once more in the vertical plane.

Lastly, the non-soldered half of the nest is heated at the lower part in a similar manner to that described above.

In the same manner as before, after leaving the soldering zone and the eventual passage facing the point for blowing on the run-outs, the assembly is subjected to a more or less accelerated cooling, intended to allow storage handlings and manipulations necessitated by the last mounting operation, checking or putting under pressure to be carried out.

FIGURE 2 shows the device for operating the method described above.

According to this example, the device comprises a conveyor 1 determining a line and progressing direction for the nests that it conveys towards two successive ovens 2 and 2a each confining a pre-heating zone 3 respectively 3a and a soldering zone 4, respectively 4a.

As already explained above, each pre-heating zone may comprise a second chamber 5 or 5a provided to compensate for the different inertias of the fins and collectors.

The device is more particularly shown in FIGURE 2, under the form of an equipment in line, but it is quite obvious that other arrangements can be considered in function of the premises and effective surface available, for example, an installation in close circuit illustrated by FIGURE 3 or an installation in staged circuit shown in FIGURE 4.

The invention is not restricted to the forms of embodiment described in detail, for various modifications can be applied to it without going outside of its scope.

What is claimed is:

1. A continuous method for the manufacture of heat exchanger cores of the type comprising circulating tubes covered with fusible solder and secured at both ends respectively with upper and lower collectors also covered with fusible solder and provided with collars around holes through which said tubes extend and having heat dissipating means along the entire length of said tubes, said method consisting essentially of: in a continuous manner providing said collectors with collars extending in opposite directions respectively for said upper and lower collectors; assembling said solder covered collectors and heat dissipating means on said solder covered tubes to form a unit with the collars of said collectors extending in the same direction; submitting said unit to a fluxing action; submitting substantially one half of said unit including one collector to blowing heated air to provide a temperature to which said fusible solder covering at least said tubes and collectors is melted to effect soldering of said tubes to said heat dissipating means and to said colector of said half unit; air cooling said soldered portion of the unit; turning said unit 180° and then submitting the remaining portion of said unit to same blowing heated air and cooling actions.

2. A method as set forth in claim 1, wherein during said blowing of heated air said tubes are maintained in vertical position with the collector of said half unit at the base thereof whereby fusible solder flows towards said collector when melted.

3. A method as set forth in claim 1, wherein said heating by blowing of heated air to which each half of said unit is subjected comprises preheating by blowing of heated air over only said collector at a temperature lower than the melting temperature of said fusible solder coating, and then blowing heated air over the whole lower half unit including said preheated collector until the melting temperature of said fusible solder is reached, whereby heating action is uniformized despite difference of thermic inertia of said collector with respect to said tubes and heat dissipating means.

4. A method as set forth in claim 1, wherein the unit is heated by blowing heated air at each occurrence along half of its height plus a small extent beyond its midpoint whereby heating action is produced twice on a zone of said unit situated at the middle part thereof.

References Cited

UNITED STATES PATENTS

| | | | |
|---|---|---|---|
| 2,191,631 | 2/1940 | Shutts et al. | 113—118 |
| 2,211,813 | 8/1940 | Franco-Ferreira | 29—157.3 |
| 2,184,658 | 12/1939 | Young | 29—157.3 X |
| 2,650,420 | 9/1953 | True | 29—495 X |
| 2,765,761 | 10/1956 | Truran | 228—20 |
| 3,139,679 | 7/1964 | Saj | 29—471.1 |
| 2,298,996 | 10/1942 | Woods | 29—502 X |

FOREIGN PATENTS

| | | |
|---|---|---|
| 929,664 | 6/1963 | Great Britain. |
| 1,219,386 | 5/1960 | France. |

CHARLIE T. MOON, *Primary Examiner.*